United States Patent Office 3,069,456
Patented Dec. 18, 1962

3,069,456
BIS-α-CYANOCINNAMIC ACID ESTERS
Albert F. Strobel, Delmar, and Sigmund C. Catino, Castleton, N.Y., assignors to General Aniline & Film Corporation, New York, N.Y., a corporation of Delaware
No Drawing. Filed Jan. 27, 1959, Ser. No. 789,270
6 Claims. (Cl. 260—465)

This invention relates to new and useful bis-α-cyanocinnamate esters, to processes for preparing same, and uses thereof.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered a class of compounds which are not only compatible with a great number of film-forming plastics, resins, gums, waxes and the like, but which, further, exhibit outstanding ultra-violet absorbing properties within the generally encountered ultra-violet region of 250 to 400 millimicrons. The compounds of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of the colored formulation such as a paint film or a dyed textile.

It is therefore an object of the present invention to provide new and useful compounds characterized by outstanding ultra-violet absorbing properties.

It is a further object of this invention to provide new and useful bis-α-cyano-p-hydroxycinnamic acid esters.

It is a still further object of this invention to provide new and useful bis-α-cyano-p-hydroxycinnamic acid esters exhibiting outstanding ultra-violet properties.

It is another object of this invention to provide processes for the preparation of new and useful ultra-violet absorbing compounds.

It is still another object of this invention to provide processes for the preparation of new and useful bis-α-cyano-p-hydroxycinnamic acid esters.

Other objects and advantages will appear hereinafter as the description proceeds.

The new and useful compounds of this invention are characterized by the following general formula:

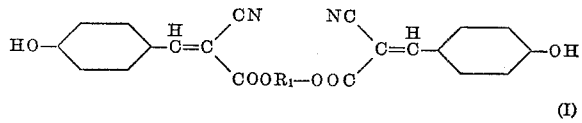

(I)

where $R_1$ may be alkylene, substituted alkylene, arylene, substituted arylene, or heterocyclic, for example: —$CH_2CH_2$—; —$CH_2CH_2CH_2$—; —$CH_2CH_2CH_2CH_2$—; —$CH_2CH_2CH_2CH_2CH_2$—;

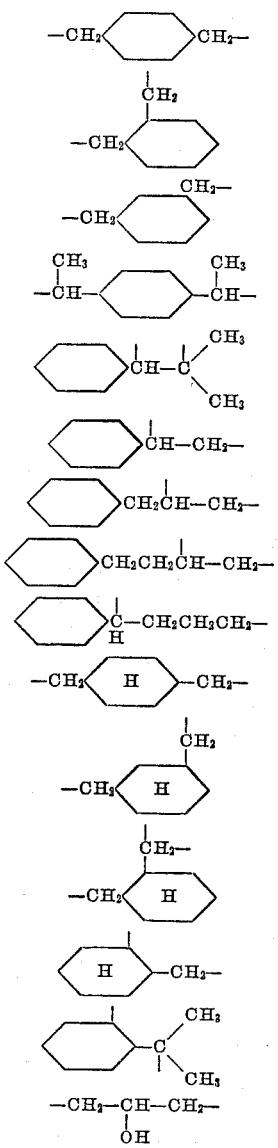

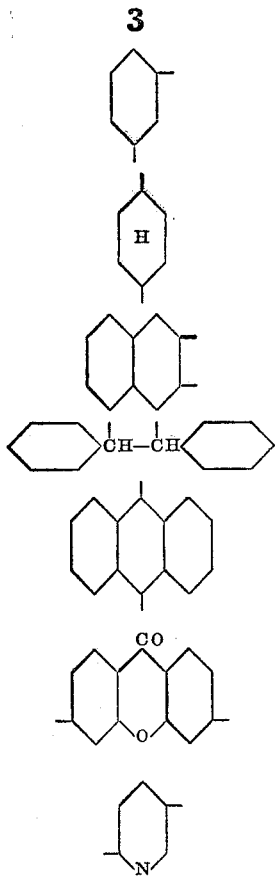

The general process for the preparation of the compounds of Formula I involves the condensation of p-hydroxy benzaldehyde with the corresponding ester of cyanoacetic acid in the presence of a secondary base.

The basic condensation catalyst should be any secondary aliphatic amino compound and preferably a secondary aliphatic amine such as piperidine. However, other bases which may be used include the following:

Diethylamine
Di-n-propylamine
Cyclohexylamine
Morpholine
Diethanolamine, and the like The usual procedure involves heating a mixture of the reactants in the presence of the basic catalyst at elevated temperatures until the reaction is substantially complete. A solvent may be employed to effect miscibility of the reactants and when such a solvent is used, the temperature of the reaction will usually be the reflux temperature of the solvent solution of the ingredients. In the absence of a solvent, temperatures from about 75 to 150° C. may be used. The time of reaction will of course vary depending upon the specific reactants and the temperature used. In some instances a relatively low temperature for a short period of time effects the formation of a substantially quantitative yield of the desired ester. In other cases, longer times and higher temperatures are necessary to get the best yields. It is of course again obvious to one skilled in the art to ascertain for any given combination of reactants the most efficacious combination of temperature and time.

Upon the completion of the esterification reaction, the desired ester is isolated, usually by evaporation of the volatile constituents, namely, water which is liberated in the condensation reaction, any alcohol which may be employed as a solvent, and the basic catalyst where the latter is a liquid and normally and readily removable by distillation or volatilization. It is also possible in certain instances, to isolate the desired ester product by diluting the reaction mixture wth a solvent which precipitates out the ester. Thus, methanol may be employed in many cases as such a diluent, and the resultant slurry is then filtered at low temperatures (0 to 5° C.) to separate the crystalline product.

The following examples will serve to illustrate the present invention without being deemed limitative thereof. Where parts are indicated, parts by weight are intended.

EXAMPLE 1

Preparation and application of

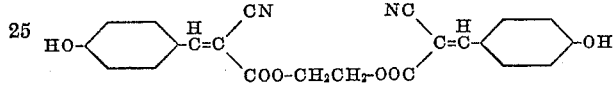

This compound is prepared by heating 2 molecular equivalents of p-hydroxy benzaldehyde with 1 molecular equivalent of ethylene glycol di(α-cyanoacetate)

using 1 liter of alcohol as solvent in the presence of 10 gms. of piperidine as catalyst by boiling for 8 hours, The alcohol, water (liberated), and piperidine are evaporated at the end of the reaction to give the crude product which was slurried with dilute hydrochloric acid, the water removed and dried. The intermediate

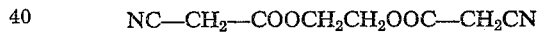

is prepared as described in U.S. Patent 2,426,056, Example 1 (using excess cyanoacetic acid), in the following manner.

One mole of ethylene glycol, 3 moles of cyanoacetic acid, 10 g. toluenesulfonic acid and 180 cc. benzene are heated under reflux, removing water and returning benzene to the reaction for 18 hours. Thereafter the benzene is distilled off and the pH adjusted to 8 with sodium carbonate. Ethyl acetate is employed to extract the diester and the latter is recovered by distilling off the ethyl acetate.

The bis compound is employed to stabilize a polyester composition by adding 250 mg. thereof to 100 g. of Polylite 8000 containing 1% benzoyl peroxide. A clear casting is made between glass plates and cured as follows:

Placed in oven; temperature =65° C. Temperature raised to 95° C.—held 1 hour—then raised to 120° C.—held for ½ hour to complete curing.

Resin so prepared is much more light fast than same casting without the absorber.

EXAMPLE 2

Preparation of

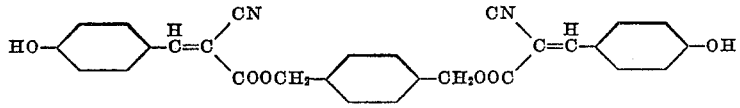

The procedure of Example 1 is repeated employing 1,4-xylyleneglycol di(α-cyanoacetate); the latter is prepared similarly as the ethylene glycol di(α-cyanoacetate) except that 1,4-xylyleneglycol is used in place of ethylene glycol.

EXAMPLE 3

*Preparation of*

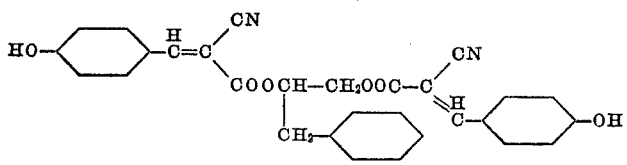

The procedure of Example 1 is again repeated employing 1-phenyl-2,3-propyleneglycol di(α-cyanoacetate) which is prepared similarly as the other diesters from 1-phenyl-2,3-propyleneglycol and an excess of cyanoacetic acid.

The compounds of this invention are in general soluble in a great variety of solvents, plastics, resins, waxes and the like, and therefore are particularly useful and adaptable for the stabilization of a great variety of different types of organic materials.

The amount of stabilizer to be incorporated is not particularly critical except that sufficient thereof should be present to effect the desired degree of stabilization, and no more should be used than is necessary to obtain this result since obviously this would be poor economics. In general, between 0.1% and 10% of the stabilizer based on the solids content of the organic material may be used, and preferably, between about 0.5% and about 2%. The ultra-violet absorbers of this invention may be employed not only as stabilizers for clear plastics and the like as exemplified above, but they may be employed in opaque, semi-opaque and/or translucent materials, the surface of which is susceptible to degradation by ultra-violet light. Among such types of materials, mention may be made of foamed plastics, opaque films and coatings, opaque and translucent papers, opaque and translucent fibers, transparent and opaque colored plastics, fluorescent pigments, polishes, creams, lotions and the like, whether opaque, clear or translucent. The compounds employed in this invention give outstanding protection to paint, enamel and varnish films against fading of the pigments and dyes contained therein.

Other variations in and modifications of the described processes which will be obvious to those skilled in the art can be made in this invention without departing from the scope or spirit thereof.

We claim:
1. A compound of the formula

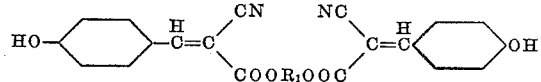

wherein $R_1$ is a radical selected from the group consisting of alkylene and arylene radicals.

2. A compound as defined in claim 1 wherein $R_1$ is —$CH_2CH_2$—.
3. A compound as defined in claim 1 wherein $R_1$ is —$CH_2CH_2CH_2$—.
4. A compound as defined in claim 1 wherein $R_1$ is —$CH_2CH_2CH_2CH_2$—.
5. A compound as defined in claim 1 wherein $R_1$ is

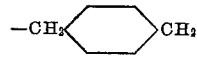

6. A compound as defined in claim 1 wherein $R_1$ is

References Cited in the file of this patent
UNITED STATES PATENTS

| | | |
|---|---|---|
| 2,293,032 | Hechenbleikner | Aug. 18, 1942 |
| 2,380,063 | Mowry | July 10, 1945 |
| 2,386,855 | Horback | Oct. 16, 1945 |
| 2,740,761 | Gleim | Apr. 3, 1956 |
| 2,789,125 | Kartinos et al. | Apr. 16, 1957 |